United States Patent
Colgrove et al.

(10) Patent No.: US 10,496,556 B1
(45) Date of Patent: Dec. 3, 2019

(54) DYNAMIC DATA PROTECTION WITHIN A FLASH STORAGE SYSTEM

(71) Applicant: Pure Storage, Inc., Mountain View, CA (US)

(72) Inventors: John Colgrove, Los Altos, CA (US); Alan S. Driscoll, Fremont, CA (US); Steven P. Hodgson, Mountain View, CA (US); Nitin Nagpal, Redwood City, CA (US); Emanuel G. Noik, Palo Alto, CA (US); John Roper, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 222 days.

(21) Appl. No.: 14/751,128

(22) Filed: Jun. 25, 2015

Related U.S. Application Data

(60) Provisional application No. 62/016,992, filed on Jun. 25, 2014.

(51) Int. Cl.
*G06F 12/00* (2006.01)
*G06F 12/14* (2006.01)

(52) U.S. Cl.
CPC .. *G06F 12/1491* (2013.01); *G06F 2212/1052* (2013.01); *G06F 2212/262* (2013.01)

(58) Field of Classification Search
None
See application file for complete search history.

(56) References Cited

U.S. PATENT DOCUMENTS

| | | |
|---|---|---|
| 5,208,813 A | 5/1993 | Stallmo |
| 5,403,639 A | 4/1995 | Belsan |
| 5,940,838 A | 8/1999 | Schmuck et al. |
| 6,178,520 B1 * | 1/2001 | DeKoning ............ G06F 3/0607 711/114 |
| 6,263,350 B1 | 7/2001 | Wollrath et al. |
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Masaaki et al. |
| 6,834,298 B1 | 12/2004 | Singer et al. |
| 6,850,938 B1 | 2/2005 | Sadjadi |
| 6,915,434 B1 | 7/2005 | Kuroda |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Jason W Blust

(57) ABSTRACT

Dynamically managing protection groups, including: identifying a protection group of storage resources, the protection group associated with a protection group management schedule that identifies one or more protection group management operations to be performed; detecting a membership change in the protection group; and updating, in dependence upon the change in the protection group, the protection group management schedule.

16 Claims, 6 Drawing Sheets

(56) References Cited

U.S. PATENT DOCUMENTS

| | | |
|---|---|---|
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,117,464 B1 | 2/2012 | Kogelnik |
| 8,205,065 B2 | 6/2012 | Matze |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,751,463 B1 | 6/2014 | Chamness |
| 8,789,208 B1* | 7/2014 | Sundaram ............... H04L 29/06 726/28 |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0294859 A1* | 11/2008 | Nguyen ............... G06F 11/1451 711/162 |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0041929 A1* | 2/2012 | Kapoor ............ G06F 17/30014 707/661 |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1* | 7/2014 | Kumarasamy ...... G06F 11/1451 707/639 |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

* cited by examiner

DYNAMIC DATA PROTECTION WITHIN A FLASH STORAGE SYSTEM

CROSS-REFERENCE TO RELATED APPLICATION

This application is a non-provisional application for patent entitled to a filing date and claiming the benefit of earlier-filed U.S. Provisional Patent Application Ser. No. 62/016,992, filed on Jun. 25, 2014.

BACKGROUND

Field of Technology

The field of technology is methods, apparatuses, and products for dynamically managing protection groups.

Description of Related Art

Enterprise storage systems can provide large amounts of computer storage to modern enterprises. Such computer storage can be embodied as a plurality of storage devices such as hard disk drives ('HDDs'), solid-state drives ('SSDs'), and so on. Logical entities within the storage system may be subjected to similar policies for managing the logical entities through the use of protection groups. Such protection groups, however, are static in the sense that once members are added and policies for managing the members are in place, the members are permanently subjected to the policies associated with the protection group.

SUMMARY

Methods, apparatuses, and products for dynamically managing protection groups, including: identifying, by a storage array controller, a protection group of storage resources, the protection group associated with a protection group management schedule that identifies one or more protection group management operations to be performed; detecting, by the storage array controller, a membership change in the protection group; and updating, by the storage array controller in dependence upon the change in the protection group, the protection group management schedule.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
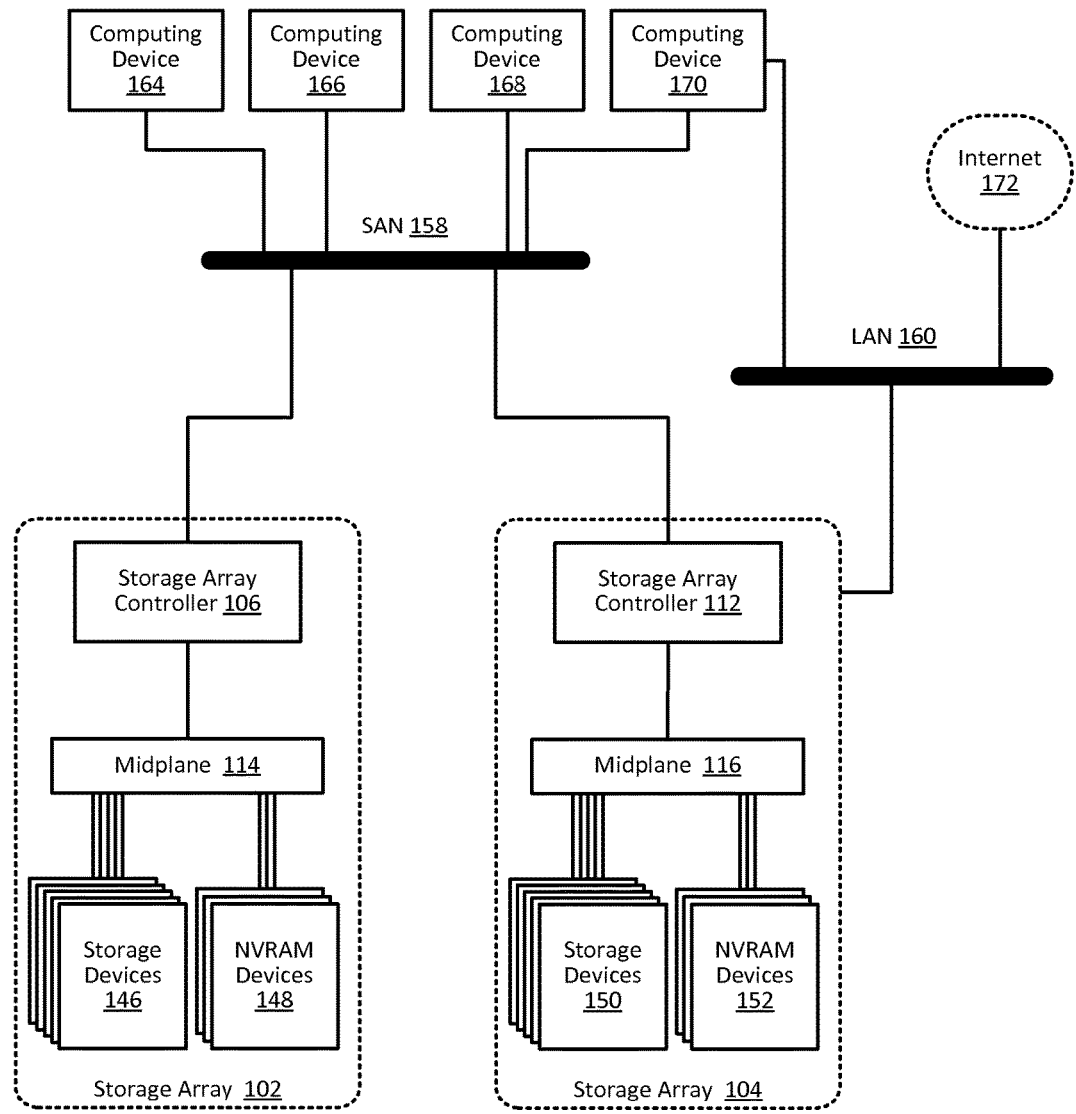
FIG. 1 sets forth a block diagram of a system configured for dynamically managing protection groups according to embodiments of the present invention.

Example methods, apparatuses, and products for dynamically managing protection groups in accordance with the present invention are described with reference to the accompanying drawings, beginning with FIG. 1. FIG. 1 sets forth a block diagram of a system configured for dynamically managing protection groups according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to one or more storage arrays (102, 104) through a storage area network ('SAN') (158) as well as a local area network ('IAN') (160). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one of many possible data communications couplings which may be implemented between a computing device (164, 166, 168, 170) and a storage array (102, 104), and readers will further appreciate that any other data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol (In, HyperText Transfer Protocol ('HTTP'), Wireless Access Protocol ('WAP'), Handheld Device Transport Protocol ('HDTP'), Session Initiation Protocol (SIP), Real Time Protocol ('RTP'), and others as will occur to those of skill in the art.

The example storage arrays (102, 104) of FIG. 1 provide persistent data storage for the computing devices (164, 166, 168, 170). Each storage array (102, 104) depicted in FIG. 1 includes a plurality of storage array controllers (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing Redundant Array of Independent Drives ('RAID') or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of non-volatile Random Access Memory ('NVRAM') devices (148, 152).

Each NVRAM device (148, 152) may be configured to receive, from the storage array controller (106, 112), data to be stored in the storage devices (146). Such data may originate from any one of the computing devices (164, 166, 168, 170). In the example of FIG. 1, writing data to the NVRAM device may be carried out more quickly than writing data to the storage device. The storage array controller (106, 112) may be configured to effectively utilize the NVRAM devices (148, 152) as a quickly accessible buffer for data destined to be written to the storage devices. In this way, the latency for write requests may be significantly improved relative to a system in which the storage array controller writes data directly to the storage devices (146, 150).

The NVRAM devices may be implemented with computer memory in the form of high bandwidth, low latency RAM. In such an embodiment, each NVRAM device is referred to as 'non-volatile' because each NVRAM device may receive or include a unique power source that maintains the state of the RAM after main power loss to the NVRAM device (148, 152). Such a power source may be a battery, one or more capacitors, or the like. During the power loss, the NVRAM device (148, 152) may be configured to write the contents of the RAM to a persistent storage, such as the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives ("Flash drives"), and the like.

The storage array controllers (106, 112) of FIG. 1 may be configured for dynamically managing protection groups according to embodiments of the present invention. A protection group represents container objects that are used to group one or more storage elements such as, for example, storage volumes, collections of physical or virtual storage devices identified by a logical unit numbers ('LUNs'), one or more hosts, one or more host groups, and so on. A single protection group may consist, for example, of hosts, host groups, volumes, virtual machines, and objects. Likewise, hosts, host groups, volumes, virtual machines, and objects may be associated with multiple protection groups. Each of the storage elements that are included in a particular protection group may be subject to the same protection policy that includes, for example, a schedule defining the manner in which snapshots will be taken of the storage elements that are included in a particular protection group, a schedule defining the manner in which the storage elements that are included in a particular protection group will be replicated, and so on.

The storage array controllers (106, 112) may dynamically manage protection groups by identifying a protection group of storage resources and data associated with the storage resources. Identifying a protection group of storage resources may be carried out, for example, by the storage array controllers (106, 112) receiving a notification each time a protection group is created, where the notification includes information such as an identification of each of the storage elements that are included in the protection group as well as information defining the protection policy for the protection group. Alternatively, identifying a protection group of storage resources may be carried out, for example, by the storage array controllers searching a data repository that includes information such as an identification of each of the storage elements that are included in the protection group as well as information defining the protection policy for the protection group. Such a data repository may be maintained by the storage array controllers (106, 112) or any other entity. The protection groups may be associated with data such as, for example, one or more snapshots of volumes that are included in the protection group, replication data for elements in the protection group, state information for elements in the protection group, and so on.

The protection groups may also be associated with a protection group management schedule that identifies one or more protection group management operations to be performed. The protection group management operations may be embodied, for example, as an operation that results in the members of the protection group being replicated to a preselected storage system, as an operation that that results in snapshots being taken for each of the members of the protection group, where the snapshots are stored at a preselected location with the storage system, and so on. In such an example, the protection group management operations may be carried out according to a protection group management schedule that identifies one or more protection group management operations that are to be performed at various times, various intervals, in response to various triggering events, and so on.

The protection groups may be destroyed, eradicated, and recovered using corresponding subcommands. For example, when a 'destroy' subcommand is issued, the specified protection group and all of its snapshots may be destroyed. A destroyed protection group and its snapshots may undergo an eradication pending period after which time the protection group and its snapshots are completely eradicated and unrecoverable. During the eradication pending period, the destruction of the protection group and its snapshots may be cancelled by executing a 'recover' subcommand. The 'recover' subcommand may cause the protection group, including its replication schedule and snapshots, to return to its original state.

The storage array controllers (106, 112) may further dynamically manage protection groups by detecting a membership change in the protection group. A membership change in the protection group may occur for a variety of reasons. For example, a host may be added to the protection group, such that the newly added host and all volumes accessible by the newly added host become part of the protection group. Likewise, a host may be added to a host group that is part of the protection group, such that the newly added host and all volumes accessible by the newly added host become part of the protection group. Conversely, a host may be removed from a host group that is part of the protection group, such that the removed host and all volumes accessible by the removed added host are no longer part of the protection group, unless the volumes are accessible by other hosts in the protection group. Readers will appreciate that many other events such as adding volumes to the protection group, removing volumes from the protection group, removing volumes from a storage system, and many other events may cause a change in the membership of the protection group.

The storage array controllers (106, 112) may detect a membership change in the protection group by examining snapshots of the protection group. Such snapshots may list all the volumes (whether listed explicitly or indirectly through hosts and host groups) that were in the protection group at the time of the snapshot, such that the complete and correct list of logical devices is readily apparent through inspecting the snapshot. Alternatively, the storage array controllers (106, 112) may detect a membership change in the protection group by receiving a notification from a host or host group every time the host joins a protection group, exits a protection group, gains access to a new volume, loses access to a volume, and so on.

The storage array controllers (106, 112) may further dynamically manage protection groups by updating, in dependence upon the change in the protection group, the protection group management schedule. Updating the protection group management schedule in dependence upon the change in the protection group (304, 310) may be carried out, for example, by the storage array controllers (106, 112) updating a replication schedule for the protection group to include volumes that were added to the protection group, by the storage array controllers (106, 112) updating a replication schedule for the protection group to remove volumes that were removed from the protection group, by the storage array controllers (106, 112) updating a snapshot schedule for the protection group to include volumes that were added to the protection group, by the storage array controllers (106, 112) updating a snapshot schedule for the protection group to remove volumes that were removed from the protection group, and so on.

The arrangement of computing devices, storage arrays, networks, and other devices making up the example system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Dynamically managing protection groups in accordance with embodiments of the present invention is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful for dynamically managing protection groups according to embodiments of the present invention.

Figure 2:
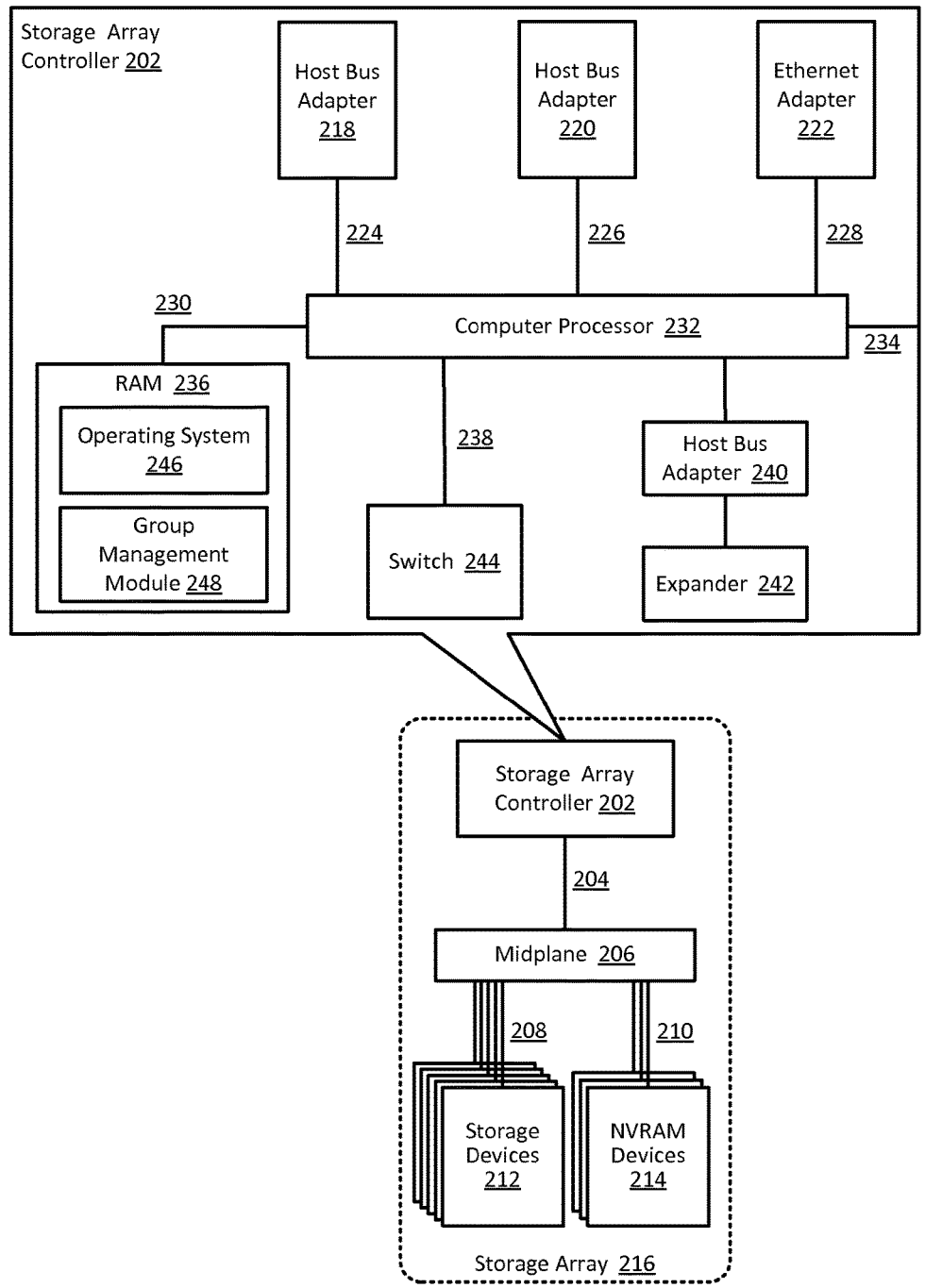
FIG. 2 sets forth a block diagram of an example storage array controller useful in dynamically managing protection groups according to embodiments of the present invention.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more NVRAM devices (214) that are included as part of a storage array (216). The storage array controller (202) may be coupled to the midplane (206) via one or more data communications links (204) and the midplane (206) may be coupled to the storage devices (212) and the NVRAM devices (214) via one or more data communications links (208, 210). The data communications links (204, 208, 210) of FIG. 2 may be embodied, for example, as Peripheral Component Interconnect Express ('PCIe') bus. The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for dynamically managing protection groups according to embodiments of the present invention include UNIX™, Linux™, Microsoft Windows™, and others as will occur to those of skill in the art. Also stored in RAM (236) is a group management module (248), a module of computer program instructions for o dynamically managing protection groups according to embodiments of the present invention. The group management module (248) may be configured to perform steps such as identifying a protection group of storage resources, detecting a membership change in the protection group, and updating the protection group management schedule in dependence upon the change in the protection group, and other steps that will be described in greater detail below as being performed by the storage array controller generally. Readers will appreciate that while the group management module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect.

Readers will recognize that these components, protocols, adapters, and architectures are for illustration only, not limitation. Such a storage array controller may be implemented in a variety of different ways, each of which is well within the scope of the present invention.

Figure 3:
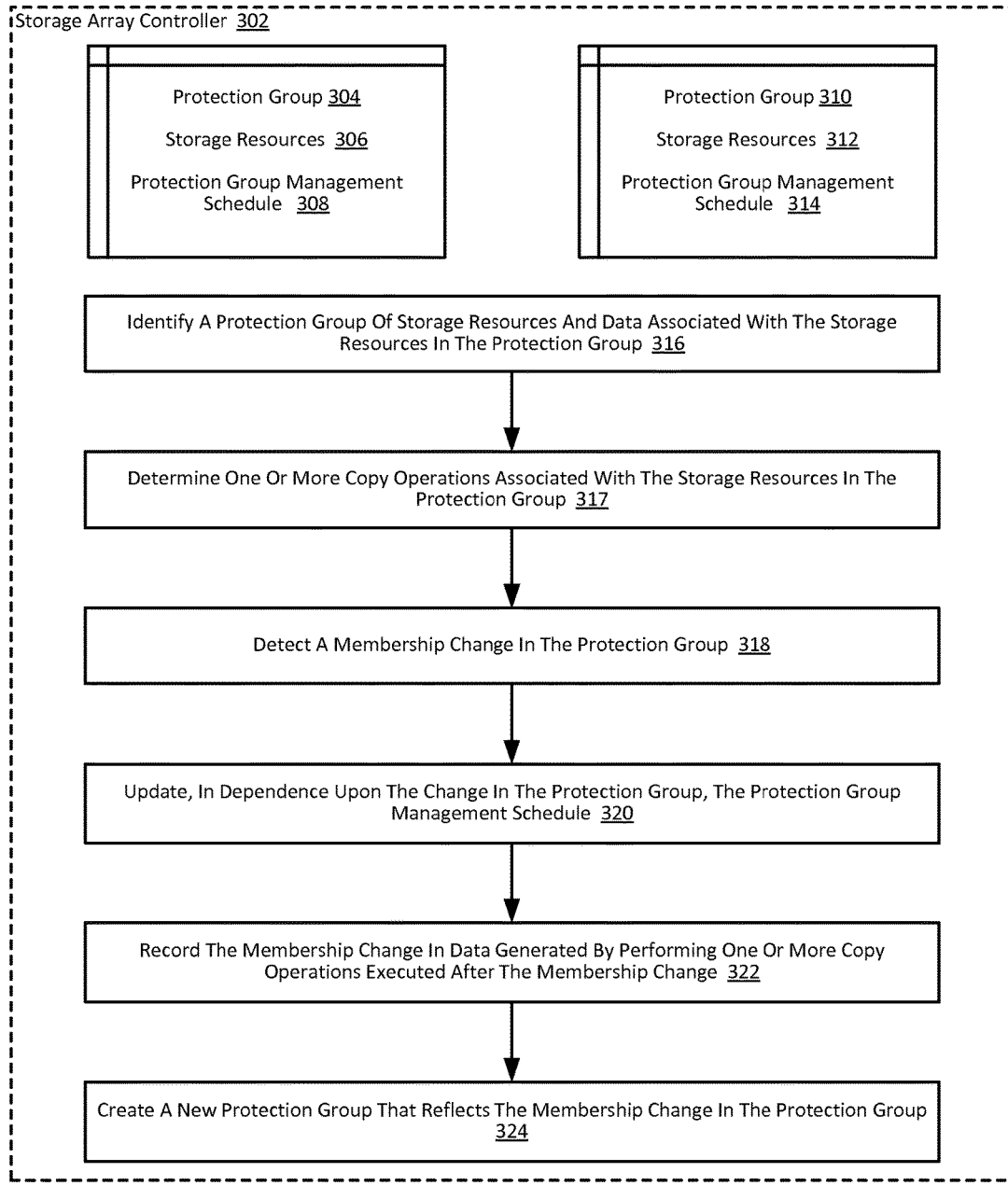
FIG. 3 sets forth a flow chart illustrating an example method for dynamically managing protection groups according to embodiments of the present invention.

For further explanation, FIG. 3 sets forth a flow chart illustrating an example method for dynamically managing protection groups (304, 310) according to embodiments of the present invention. The protection groups (304, 310) of FIG. 3 represent container objects that are used to group one or more storage elements such as, for example, storage volumes, collections of physical or virtual storage devices identified by a logical unit numbers ('LUNs'), one or more hosts, one or more host groups, and so on. A single protection group may consist, for example, of multiple hosts, host groups, and volumes. Likewise, hosts, host groups, and volumes may be associated with multiple protection groups. Each of the storage elements that are included in a particular protection group (304, 310) may be subject to the same protection policy that includes, for example, a schedule defining the manner in which snapshots will be taken of the storage elements that are included in a particular protection group (304, 310), a schedule defining the manner in which the storage elements that are included in a particular protection group (304, 310) will be replicated, and so on.

The example method depicted in FIG. 3 includes identifying (316), by a storage array controller (302), a protection group (304, 310) of storage resources (306, 312) and data associated with the storage resources (306, 312) in the protection group (304, 310). Identifying (316) a protection group (304, 310) of storage resources (306, 312) may be carried out, for example, by the storage array controller (302) receiving a notification each time a protection group (304, 310) is created, where the notification includes information such as an identification of each of the storage elements that are included in the protection group (304, 310) as well as information defining the protection policy for the protection group (304, 310). Alternatively, identifying (316) a protection group (304, 310) of storage resources (306, 312) may be carried out, for example, by the storage array controller (302) searching a data repository that includes information such as an identification of each of the storage elements that are included in the protection group (304, 310) as well as information defining the protection policy for the protection group (304, 310). Such a data repository may be maintained by the storage array controller (302) or any other entity.

The protection groups (304, 310) of FIG. 3 may be associated with a protection group management schedule (308, 314) that identifies one or more protection group management operations to be performed. The protection group management operations may be embodied, for example, as an operation that results in the members of the protection group (304, 310) being replicated to a preselected storage system, as an operation that that results in snapshots being taken for each of the members of the protection group (304, 310), where the snapshots are stored at a preselected location with the storage system, and so on. In such an example, the protection group management operations may be carried out according to a protection group management schedule (308, 314) that identifies one or more protection group management operations that are to be performed at various times, various intervals, in response to various triggering events, and so on.

The example method depicted in FIG. 3 also includes determining (317) one or more copy operations associated with the storage resources (306, 312) in the protection group (304, 310). Each copy operation may be embodied, for example, as an operation that results in the storage of data depicting the current state of the storage resources (306, 312) in the protection group (304, 310). Examples of such copy operations can include a snapshot operation that identifies changes to data stored in one of the storage resources (306, 312) in the protection group (304, 310), a replication operation that results in the replication of one or more of the storage resources (306, 312) in the protection group (304, 310), and so on.

The example method depicted in FIG. 3 also includes detecting (318), by the storage array controller (302), a membership change in the protection group (304, 310). In the example method depicted in FIG. 3, a membership change in the protection group (304, 310) may occur for a variety of reasons. For example, a host may be added to the protection group (304, 310), such that the newly added host and all volumes accessible by the newly added host become part of the protection group (304, 310). Likewise, a host may be added to a host group that is part of the protection group (304, 310), such that the newly added host and all volumes accessible by the newly added host become part of the protection group (304, 310). Conversely, a host may be removed from a host group that is part of the protection group (304, 310), such that the removed host and all volumes accessible by the removed added host are no longer part of the protection group (304, 310), unless the volumes are accessible by other hosts in the protection group (304, 310). Readers will appreciate that many other events such as adding volumes to the protection group (304, 310), removing volumes from the protection group (304, 310), removing volumes from a storage system, adding volumes to a storage system, and many other events may cause a change in the membership of the protection group (304, 310).

In the example method depicted in FIG. 3, the storage array controller (302) may detect (318) a membership change in the protection group (304, 310) by examining snapshots of the protection group (304, 310). Such snapshots may list all the volumes (whether listed explicitly or indirectly through hosts and host groups) that were in the protection group (304, 310) at the time of the snapshot, such that the complete and correct list of logical devices is readily apparent through inspecting the snapshot. Alternatively, the storage array controller (302) may detect (318) a membership change in the protection group (304, 310) by receiving a notification from a host or host group every time the host joins a protection group, exits a protection group, gains access to a new volume, loses access to a volume, and so on.

The storage array controller (302) may be configured to automatically track changes in the membership of a protection group (304, 310). For example, if a host in a particular protection group (304, 310) uses first and second volumes at the time of the first replication, and the host later uses third and fourth volumes at the time of a second replication, the storage array controller (302) may automatically detect the changes in the use of volumes by the first host and replicate the third and fourth volumes during the second replication.

Adding volumes to a particular protection group (304, 310) is allowed, but such an addition does not automate the relationship between storage and applications, unless it is integrated externally through an API or CLI that is application aware (which is entirely reasonable, and is possible to coordinate with volume managers and databases). Adding hosts and host groups to a particular protection group (304, 310) ensures that storage operations that have to be done anyway to provide access result in the SAN array, will automatically configure the particular protection group (304, 310) to include the volumes that are assigned to the host or host group as part of regular SAN array to server/host provisioning operations.

The example method depicted in FIG. 3 also includes updating (320), by the storage array controller (302) in dependence upon the change in the protection group (304, 310), the protection group management schedule (308, 314). In the example method depicted in FIG. 3, updating (320) the protection group management schedule (308, 314) in dependence upon the change in the protection group (304, 310) may be carried out, for example, by the storage array controller (302) updating a replication schedule for the protection group (304, 310) to include volumes that were added to the protection group (304, 310), by the storage array controller (302) updating a replication schedule for the protection group (304, 310) to remove volumes that were removed from the protection group (304, 310), by the storage array controller (302) updating a snapshot schedule for the protection group (304, 310) to include volumes that were added to the protection group (304, 310), by the storage array controller (302) updating a snapshot schedule for the protection group (304, 310) to remove volumes that were removed from the protection group (304, 310), and so on.

The example method depicted in FIG. 3 also includes recording (322) the membership change in data generated by performing one or more copy operations executed after the membership change. Readers will appreciate that if the logical elements in a protection group changes, then the next point in time represented by a newer snapshot or replication point results in the copy of the protection group explicitly containing the list of logical storage elements in the source protection group at that newer point in time. As such, the membership change may be recorded (322) in data generated by performing one or more copy operations executed after the membership change.

The example method depicted in FIG. 3 also includes creating (324) a new protection group that reflects the membership change in the protection group. In the example method depicted in FIG. 3, creating (324) a new protection group that reflects the membership change in the protection group (304, 310) also has the effect of retaining a historical remnant of the protection group (304, 310) that was in place prior to the membership change, such that the protection group (304, 310) that was in place prior to the membership change may be restored after the membership change.

Figure 4:
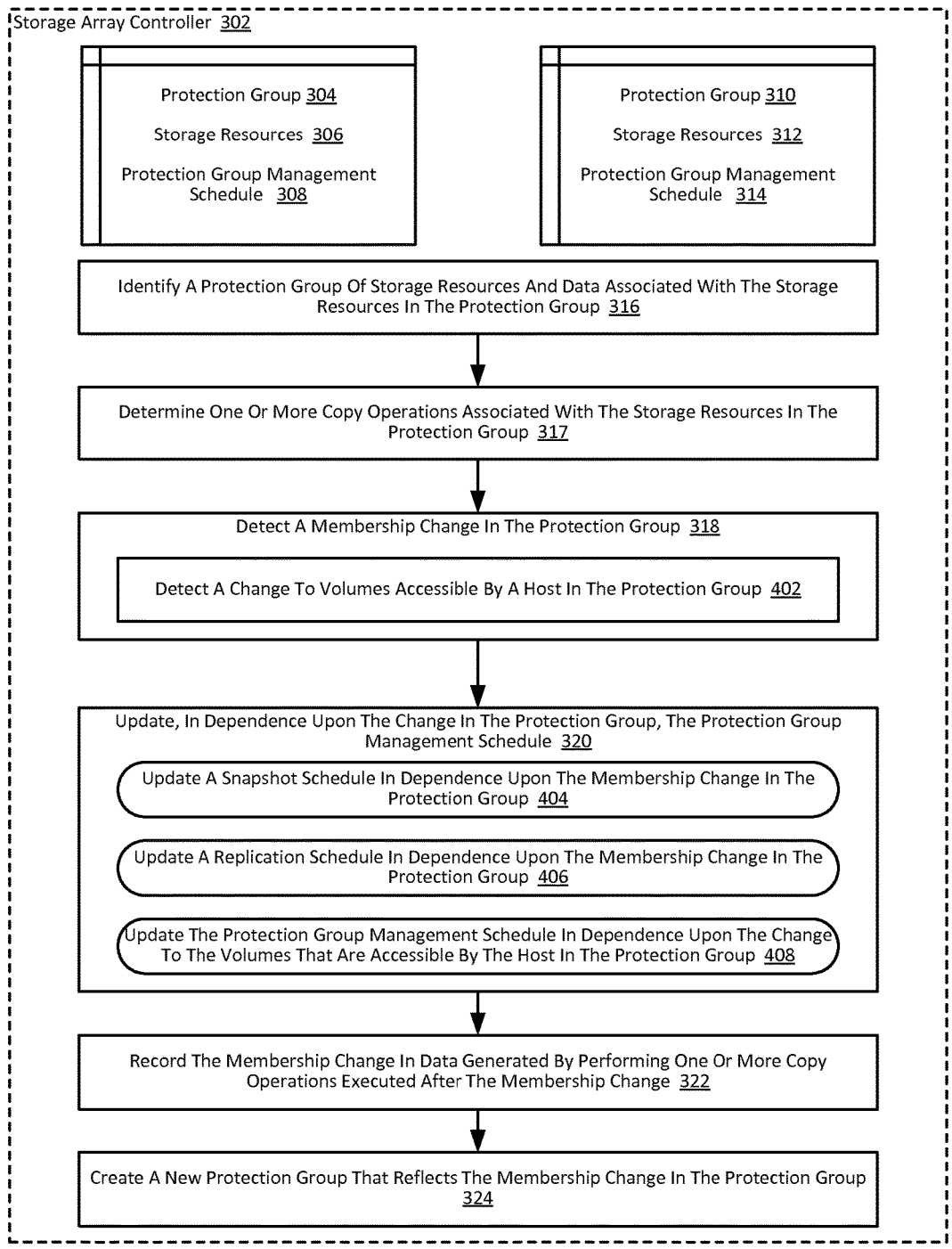
FIG. 4 sets forth a flow chart illustrating an additional example method for dynamically managing protection groups according to embodiments of the present invention.

For further explanation, FIG. 4 sets forth a flow chart illustrating an additional example method for dynamically managing protection groups (304, 310) according to embodiments of the present invention. The example method depicted in FIG. 4 is similar to the example method depicted in FIG. 3, as the example method depicted in FIG. 4 also includes identifying (316) a protection group (304, 310) of storage resources (306, 312), determining (317) one or more copy operations associated with the storage resources (306, 312) in the protection group (304, 310), detecting (318) a membership change in the protection group (304, 310), updating (320) the protection group management schedule (308, 314) in dependence upon the change in the protection group (304, 310), recording (322) the membership change in data generated by performing one or more copy operations executed after the membership change, and creating (324) a new protection group that reflects the membership change in the protection group.

In the example method depicted in FIG. 4, the protection group management operations can include an operation to take a snapshot of a source group of storage resources (306, 312) in a particular protection group (304, 308). A 'snapshot' as the term is used here refers to a capture of data stored in a storage element at a particular time. Because all data stored in a particular storage element does not necessarily change between two points in time, data captured in a first snapshot will not be duplicated in a subsequently captured second snapshot. Instead, a reference to the original data (which would otherwise be duplicated in subsequent snapshots) is included in the subsequently captured second snapshot.

In the example method depicted in FIG. 4, updating (320) the protection group management schedule (308, 314) can include updating (404) a snapshot schedule in dependence upon the membership change in the protection group. Updating (404) a snapshot schedule in dependence upon the membership change in the protection group may be carried out, for example, by identifying new volumes that have been added to the protection group (304, 310) and including those new volumes in the snapshot schedule that is applied to the protection group (304, 310). Alternatively, updating (404) a snapshot schedule in dependence upon the membership change in the protection group may be carried out, for example, by identifying volumes that have been removed from the protection group (304, 310) and removing those volumes from the snapshot schedule that is applied to the protection group (304, 310). In such a way, snapshots taken of all volumes in the protection group (304, 310) without unnecessarily taking snapshots of volumes that are not part of the protection group (304, 310).

In the example method depicted in FIG. 4, the protection group management operations can include an operation to replicate a target group of storage resources (306, 312) in a particular protection group (304, 310). The operation to replicate a target group of storage resources (306, 312) in a particular protection group (304, 310) can involve sharing information so as to ensure consistency between redundant resources, such as software or hardware components, to improve reliability, fault-tolerance, or accessibility. Examples of information that may be shared can include, for example, the current contents of a volume that is part of a particular protection group (304, 310), state information for a host that is part of a particular protection group (304, 310), state information for a host group that is part of the particular protection group (304, 310). Such state information can include, for example, information describing volumes that a host has access to, information describing the execution state of tasks being performed by a particular host, and so on.

In the example method depicted in FIG. 4, updating the protection group management schedule (308, 314) can include updating (406) a replication schedule in dependence upon the membership change in the protection group (304, 310). Updating (406) a replication schedule in dependence upon the membership change in the protection group may be carried out, for example, by identifying new hosts, host groups, or volumes that have been added to the protection group (304, 310) and including those new hosts, host groups, or volumes in the replication schedule that is applied to the protection group (304, 310). Alternatively, updating (406) a replication schedule in dependence upon the membership change in the protection group may be carried out, for example, by identifying hosts, host groups, or volumes that have been removed from the protection group (304, 310) and removing those hosts, host groups, or volumes from the replication schedule that is applied to the protection group (304, 310). In such a way, only those storage resources that are part of the protection group (304, 310) are replicated, without unnecessarily replicating storage resources that are not part of the protection group (304, 310).

In some embodiments, atomic snapshots and consistent replication between volumes, host definitions, and host group definitions may be associated with an application or dataset, even if the resulting volumes from that list are on separate storage arrays. For example, a first storage array may a first set of volumes and a second array may have a second set of volumes. In such an example, both sets of volumes can be explicitly or automatically added to a protection group, resulting in consistent replication and atomic snapshots of both sets of volumes.

In the example method depicted in FIG. 4, the protection group (304, 310) can include a host that has access to one or more volumes. Such a host may be an individual host that has been added to the protection group (304, 310). Alternatively, the host may be part of a host group that has been added to the protection group (304, 310). In such an example, detecting (318) the membership change in the protection group (304, 310) can include detecting (402) a change to volumes that are accessible by a host in the protection group. Detecting (402) a change to volumes that are accessible by a host in the protection group may be carried out, for example, by the hosts that are included in the protection group (304, 310) being configured to report a change to volumes that are accessible by the host to the storage array controller (302), by the storage array controller (302) being configured to periodically poll each host in the protection group (304, 310) to identify volumes that are accessible by the host, by a volume manager reporting all hosts that have access to each volume to the storage array controller (302), and so on.

In the example method depicted in FIG. 4, updating (320) the protection group management schedule (308, 314) can include updating (408) the protection group management schedule (308, 314) in dependence upon the change to the volumes that are accessible by each host in the protection group (304, 310). Updating (408) the protection group management schedule (308, 314) in dependence upon the change to the volumes that are accessible by each host in the protection group (304, 310) may be carried out, for example, by identifying new volumes that have been made accessible to hosts within the protection group (304, 310) and including those new volumes in the protection group management schedule (308, 314) that is applied to the protection group (304, 310). Alternatively, updating (408) the protection group management schedule (308, 314) in dependence upon the change to the volumes that are accessible by each host in the protection group (304, 310) may be carried out, for example, by identifying volumes that are no longer accessible to hosts within the protection group (304, 310) and removing those volumes that are no longer accessible to hosts within the protection group (304, 310) from the protection group management schedule (308, 314) that is applied to the protection group (304, 310).

Figure 5:
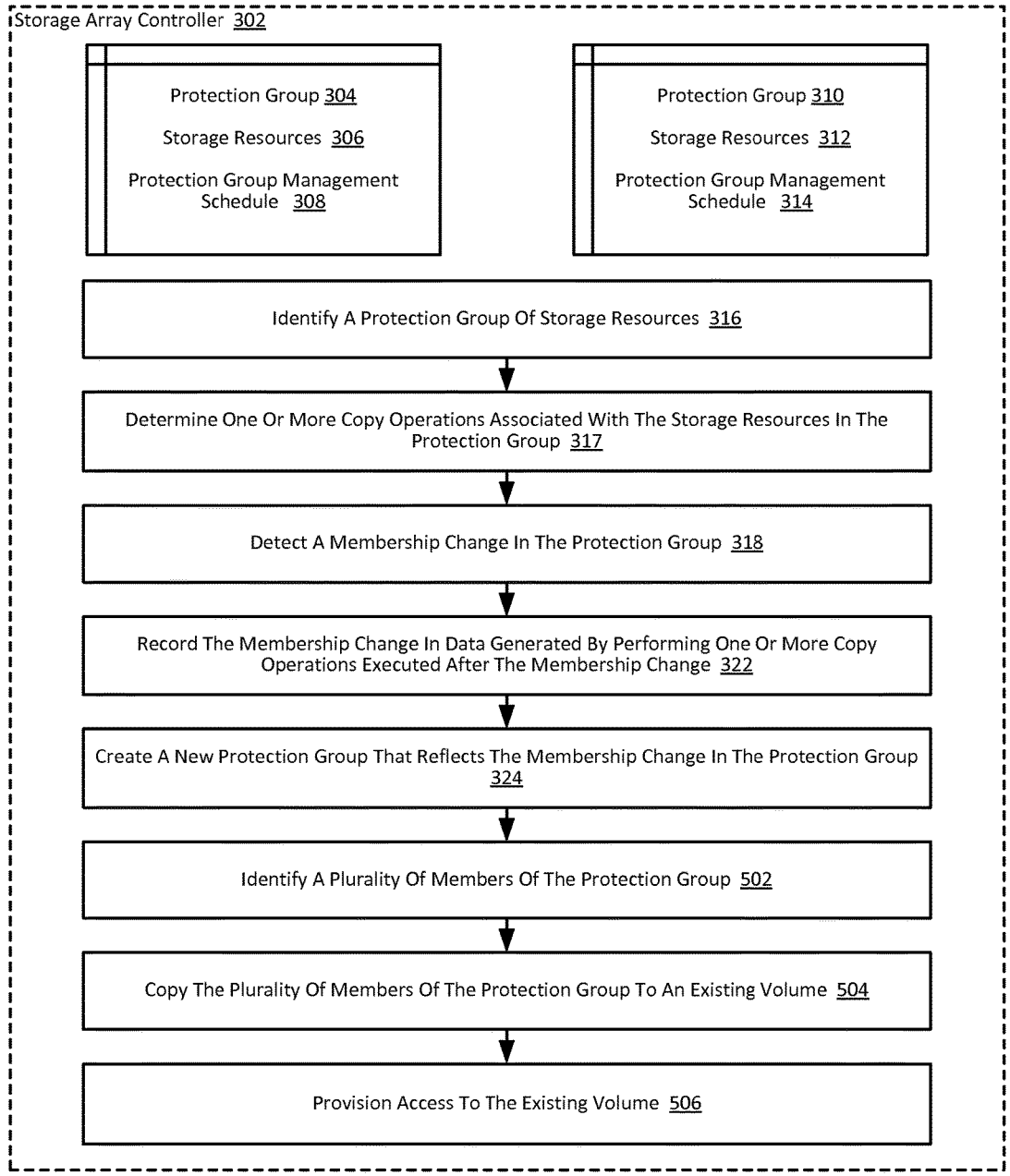
FIG. 5 sets forth a flow chart illustrating an additional example method for dynamically managing protection groups according to embodiments of the present invention.

For further explanation, FIG. 5 sets forth a flow chart illustrating an additional example method for dynamically managing protection groups (304, 310) according to embodiments of the present invention. The example method depicted in FIG. 5 is similar to the example method depicted in FIG. 3, as the example method depicted in FIG. 5 also includes identifying (316) a protection group (304, 310) of storage resources (306, 312), determining (317) one or more copy operations associated with the storage resources (306, 312) in the protection group (304, 310), detecting (318) a membership change in the protection group (304, 310), recording (322) the membership change in data generated by performing one or more copy operations executed after the membership change, and creating (324) a new protection group that reflects the membership change in the protection group. The example method depicted in FIG. 5 also includes additional steps useful in a disaster recovery operation.

The example method depicted in FIG. 5 also includes identifying (502) a plurality of members of the protection group (304, 310). In the example method depicted in FIG. 5, the plurality of members of the protection group (304, 310) may be identified (502) by examining snapshots of the protection group (304, 310). Such snapshots may list all the volumes (whether listed explicitly or indirectly through hosts and host groups) that were in the protection group (304, 310) at the time of the snapshot, such that the complete and correct list of logical devices is readily apparent through inspecting the snapshot.

The example method depicted in FIG. 5 also includes copying (504) the plurality of members of the protection group (304, 310) to an existing volume. In the example method depicted in FIG. 5, the storage array controller (302) may copy (504) the plurality of members of the protection group (304, 310) to an existing volume through the use of a 'volume copy' subcommand. The 'volume copy' subcommand may be used to copy the contents of an individual volume snapshot or all snapshots in a protection group snapshot to an existing volume.

The example method depicted in FIG. 5 also includes provisioning (506) access to the existing volume. In the example method depicted in FIG. 5, because the contents of an individual volume snapshot or all snapshots in a protection group snapshot have been copied (504) to the existing volume, access to the existing volume may be provisioned (506) by providing access to the existing volume to the hosts or host groups in the protection group (304, 310).

Figure 6:
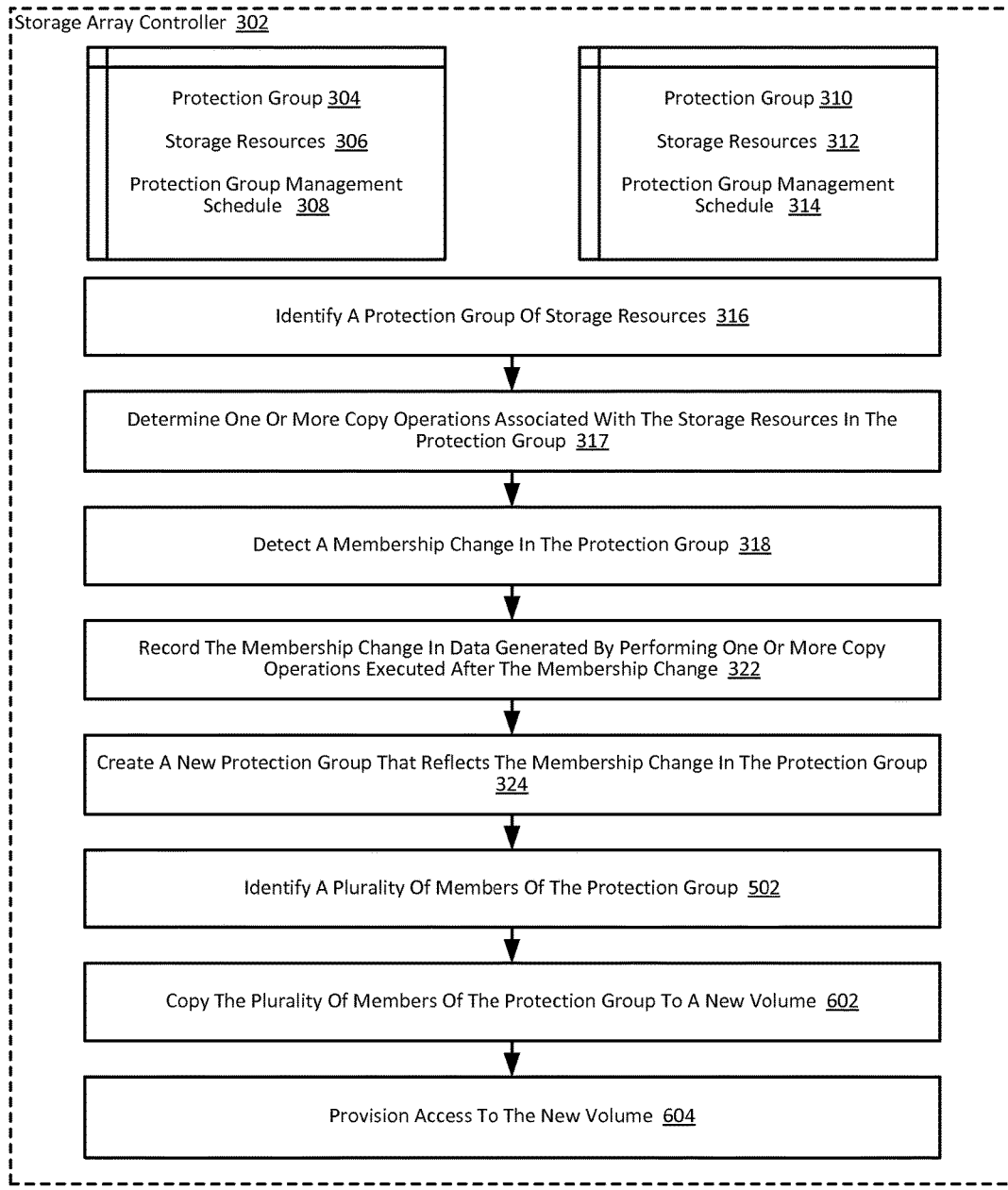
FIG. 6 sets forth a flow chart illustrating an additional example method for dynamically managing protection groups according to embodiments of the present invention.

For further explanation, FIG. 6 sets forth a flow chart illustrating an additional example method for dynamically managing protection groups (304, 310) according to embodiments of the present invention. The example method depicted in FIG. 6 is similar to the example methods depicted in FIGS. 3-5, as the example method depicted in FIG. 6 also includes identifying (316) a protection group (304, 310) of storage resources (306, 312), determining (317) one or more copy operations associated with the storage resources (306, 312) in the protection group (304, 310), detecting (318) a membership change in the protection group (304, 310), recording (322) the membership change in data generated by performing one or more copy operations executed after the membership change, creating (324) a new protection group that reflects the membership change in the protection group, and identifying (502) a plurality of members of the protection group (304, 310). The example method depicted in FIG. 6 also includes additional steps useful in a disaster recovery operation.

The example method depicted in FIG. 6 also includes copying (602) the plurality of members of the protection group (304, 310) to a new volume. In the example method depicted in FIG. 6, the storage array controller (302) may copy (602) the plurality of members of the protection group (304, 310) to a new volume through the use of a 'volume copy' subcommand. The 'volume copy' subcommand may be used to copy the contents of an individual volume snapshot or all snapshots in a protection group snapshot to a new volume or a group of new volumes.

The example method depicted in FIG. 6 also includes provisioning (604) access to the new volume. In the example method depicted in FIG. 6, because the contents of an individual volume snapshot or all snapshots in a protection group snapshot have been copied (602) to the new volume, access to the new volume may be provisioned (604) by providing access to the new volume to the hosts or host groups in the protection group (304, 310).

Example embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamic data protection within a flash storage system, the method comprising:

identifying, by a storage array controller of the flash storage system, a protection group of computing resources, the protection group associated with a protection group management schedule that identifies one or more protection group management operations to be performed, wherein the protection group specifies access by a host to one or more volumes;

detecting, by the storage array controller, a membership change in the protection group including detecting that one or more volumes have been added or removed from the group of volumes accessible by the host by periodically polling, by the storage array controller, the host to identify volumes accessible by the host; and responsive to the host gaining or losing access to the one or more volumes by the addition or removal of the one or more volumes from the group of volumes, updating, by the storage array controller in dependence upon the membership change in the protection group, the protection group management schedule including at least one of updating the one or more protection group management operations to include the one or more volumes that have been added to the group of volumes accessible by the host and updating the one or more protection group management operations to exclude the one or more volumes that have been removed from the group of volumes accessible by the host.

2. The method of claim 1 wherein:

the protection group management operations include an operation to take a snapshot of a source group of storage resources in the protection group; and updating the protection group management schedule includes updating a snapshot schedule in dependence upon the membership change in the protection group.

3. The method of claim 1 wherein:

the protection group management operations include an operation to replicate a target group of storage resources in the protection group; and updating the protection group management schedule includes updating a replication schedule in dependence upon the membership change in the protection group.

4. The method of claim 1 further comprising:

identifying a plurality of members of the protection group;

copying the plurality of members of the protection group to an existing volume; and provisioning access to the existing volume.

5. The method of claim 1 further comprising:

identifying a plurality of members of the protection group by accessing a snapshot of the protection group;

copying the plurality of members of the protection group to a new volume; and provisioning access to the new volume.

6. The method of claim 1, wherein at least one volume in the protection group is associated with multiple protection groups.

7. An apparatus for dynamic data protection within a flash storage system, the apparatus including a computer processor and a computer memory, the computer memory including computer program instructions that, when executed, cause the apparatus to carry out the steps of:

identifying, by a storage array controller of the flash storage system, a protection group of computing resources, the protection group associated with a protection group management schedule that identifies one or more protection group management operations to be performed, wherein the protection group specifies access by a host to one or more volumes;

detecting, by the storage array controller, a membership change in the protection group including detecting that one or more volumes have been added or removed from the group of volumes accessible by the host by periodically polling, by the storage array controller, the host to identify volumes accessible by the host; and responsive to the host gaining or losing access to the one or more volumes by the addition or removal of the one or more volumes from the group of volumes, updating, la the storage array controller in dependence upon the membership change in the protection group, the protection group management schedule including at least one of updating the one or more protection group management operations to include the one or more volumes that have been added to the group of volumes accessible by the host and updating the one or more protection group management operations to exclude the one or more volumes that have been removed from the group of volumes accessible by the host.

8. The apparatus of claim 7 wherein:
the protection group management operations include an operation to take a snapshot of a source group of storage resources in the protection group; and
updating the protection group management schedule includes updating a snapshot schedule in dependence upon the membership change in the protection group.

9. The apparatus of claim 7 wherein:
the protection group management operations include an operation to replicate a target group of storage resources in the protection group; and
updating the protection group management schedule includes updating a replication schedule in dependence upon the membership change in the protection group.

10. The apparatus of claim 7 further comprising computer program instructions that, when executed, cause the apparatus to carry out the steps of:
identifying a plurality of members of the protection group;
copying the plurality of members of the protection group to an existing volume; and
provisioning access to the existing volume.

11. The apparatus of claim 7 further comprising computer program instructions that, when executed, cause the apparatus to carry out the steps of:
identifying a plurality of members of the protection group by accessing a snapshot of the protection group;
copying the plurality of members of the protection group to a new volume; and provisioning access to the new volume.

12. A computer program product for dynamic data protection within a flash storage system, the computer program product disposed on a non-transitory computer readable medium, the computer program product including computer program instructions that, when executed, cause a computer to carry out the steps of:
identifying, by a storage array controller of the flash storage system, a protection group of computing resources, the protection group associated with a protection group management schedule that identifies one or more protection group management operations to be performed, wherein the protection group specifies access by a host to one or more volumes;
detecting, by the storage array controller, a membership change in the protection group including detecting that one or more volumes have been added or removed from the group of volumes accessible by the host by periodically polling, by the storage array controller, the host to identify volumes accessible by the host; and
responsive to the host gaining or losing access to the one or more volumes by the addition or removal of the one or more volumes from the group of volumes, updating, by the storage array controller in dependence upon the membership change in the protection group, the protection group management schedule including at least one of updating the one or more protection group management operations to include the one or more volumes that have been added to the group of volumes accessible by the host and updating the one or more protection group management operations to exclude the one or more volumes that have been removed from the group of volumes accessible by the host.

13. The computer program product of claim 12 wherein:
the protection group management operations include an operation to take a snapshot of a target group of storage resources in the protection group; and
updating the protection group management schedule includes updating a snapshot schedule in dependence upon the membership change in the protection group.

14. The computer program product of claim 12 wherein:
the protection group management operations include an operation to replicate a source group of storage resources in the protection group; and
updating the protection group management schedule includes updating a replication schedule in dependence upon the membership change in the protection group.

15. The computer program product of claim 12 further comprising computer program instructions that, when executed, cause the computer to carry out the steps of:
identifying a plurality of members of the protection group;
copying the plurality of members of the protection group to an existing volume; and
provisioning access to the existing volume.

16. The computer program product of claim 12 further comprising computer program instructions that, when executed, cause the computer to carry out the steps of:
identifying a plurality of members of the protection group by accessing a snapshot of the protection group;
copying the plurality of members of the protection group to a new volume; and
provisioning access to the new volume.

* * * * *